Sept. 23, 1952        D. E. MARNON        2,611,771
PREPARING ORGANIC PIGMENTS IN FINELY DIVIDED FORM
Filed April 28, 1948
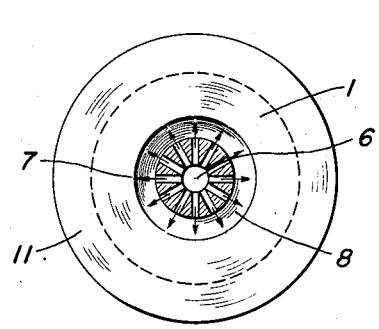
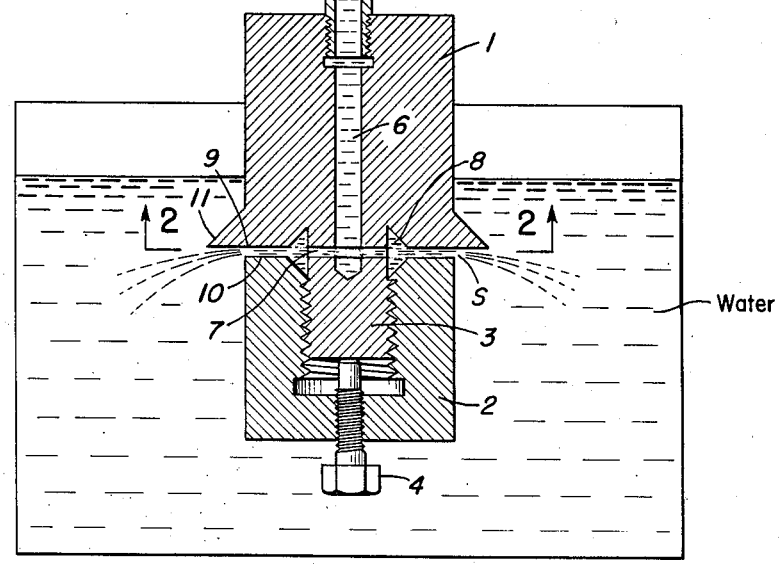
INVENTOR.
Donald E. Marnon
ATTORNEYS Patented Sept. 23, 1952

2,611,771

UNITED STATES PATENT OFFICE 2,611,771

PREPARING ORGANIC PIGMENTS IN FINELY DIVIDED FORM

Donald E. Marnon, Phillipsburg, N. J., assignor to General Aniline & Film Corporation, New York, N. Y., a corporation of Delaware Application April 28, 1948, Serial No. 23,827

6 Claims. (Cl. 260—314.5)

1

This invention relates to an improved process of preparing organic pigments in an extremely fine particle form.

It is well known that the tinctorial strength of an organic pigment depends on the size of the pigment particle and that the color strength is greater when the pigment particles are in a finely sub-divided form. To the end of attaining fine particle sub-division in organic pigments, the art has applied the precipitation process known as drowning.

Conventionally, the drowning process is carried out by dissolving the organic pigment in concentrated sulfuric acid and running the acid solution of the pigment from a pipe of small diameter into a relatively large body of water contained in a mixing vat, the water being agitated by means of a rotating stirrer. This drowning technique is sometimes called the drip method. The pigment is precipitated in a finely divided form but is not entirely free from coarse particles. The presence of coarse particles in the precipitated pigment is due to the relatively long time required to effect overall mixing of the two liquids in the mixing vat, rapid mixing taking place only in the region close to the rotating stirrer blades, with the result that globules of unmixed concentrated pigment solution are formed in the swirling liquid mass, into which globules some of the precipitated pigment particles are carried and in which, through build-up of solute thereon, they grow to particles of coarse size. Similar conditions of particle growth occur in the drowning of organic pigments by the spray process wherein the acid solution of the pigment is sprayed in fine droplets into the water which is under agitation. The time lag in drowning a pigment solution by either the spray or drip method permits digestion of the particles to an undesirable size.

I have found that by modifying the drowning process so as to effect a rapid, overall mixing of the pigment solution and aqueous drowning liquid, organic pigments can be obtained in an extremely fine state of sub-division which in fineness and uniformity of size exceed those prepared by the aforementioned conventional and spray methods of drowning.

According to my invention, the drowning process is carried out by forcing the solution of the organic pigment as a thin film or sheet into and wholly within a stationary or laminarly flowing body of the aqueous drowning liquid. The thin sheet of pigment solution in moving through the body of the aqueous drowning liquid sets up a system of relative motion between the two liquids

2 at the interface therebetween, whereby the drowning liquid, relative to the thin sheet of the pigment solution, is moving at a speed greater than its critical velocity and in a state of turbulent flow. The characteristic of a liquid in the state of turbulent flow is the presence in the liquid of innumerable small eddy currents. In the present process they occur in the drowning liquid at the interfaces on each side of the sheet of pigment solution and, eventually, through progressive action, in the sheet of pigment solution itself. It is these small eddy currents which cause a rapid, overall mixing of the two liquids with the result that formation of globules of unmixed pigment solution in the liquid mass is entirely or almost entirely avoided and the pigment precipitated in an extremely fine particle form.

The thickness of the thin sheet of the solution of the organic pigment may vary over a rather wide range. It may be as great as $\frac{1}{16}$ of an inch, although, preferably, it is substantially less than this. Generally, it is preferable to operate the drowning process with a thickness of the sheet of pigment solution of the order from about $\frac{1}{100}$ to $\frac{1}{1000}$ of an inch. The pressure applied to the pigment solution to cause it to be sheeted out into the drowning liquid will vary with the thickness of the sheet; the thinner the sheet, the higher the pressure required. Pressures up to about 5000 lbs. per square inch may be employed. For a thickness in the sheet of $\frac{1}{16}$ of an inch, a pressure on the pigment solution of about 20 lbs. per square inch will suffice, whereas for thicknesses of one to two thousandths of an inch, the pressures will range from about 2500 to 1000 lbs. per square inch. The source of the pressure may be mechanical, as by using an acid pump, or it may be hydraulic or gaseous, the source being chosen as is advantageous or necessary.

The precipitation process of the invention improves the padding and printing characteristics of organic pigments yielding colloidal or sub-colloidal particles which are especially useful in printing pastes. Used in printing pastes, the very finely divided organic pigments prepared by my process give distinct and clear prints of 10 to 40% greater tinctorial strength than the pigments prepared by drowning the sulfuric acid solution of the pigment by either the conventional drip method or the spray method, aforementioned.

Any organic pigment which is insoluble in water and soluble in the usual acid-pasting acids, such as sulfuric acid, oleum, chlorosulfonic acid, phosphoric acid, etc., or in water-soluble organic compounds such as ethyl sulfuric acid, p-toluene sulfonic acid, pyridine, quinoline, furfuryl alcohol, dioxane and the like can be precipitated in very finely divided form by the present drowning process. Among such organic pigments are the phthalocyanines, e. g., copper, cobalt and nickel phthalocyanine and vat dyestuffs, e. g., indigo, tetrabromindigo, thioindigo, indanthrones, anthraquinoneoxazoles, dipyrazol anthrones, acylaminoanthraquinones, acridones, anthranthrones, dimethoxy-dibenzanthrone, dichloro-iso-violanthrone, flavanthrones and the like.

The concentration of the acid used is not important provided the pigment is completely dissolved. The temperature used for the preparation of the solution of the pigment is dependent on the solubility and reactivity of the pigment, and the physical and chemical characteristics of the solvent. For example, in the case of concentrated sulfuric acid, temperatures at which no appreciable sulfonation occurs should be employed, e. g., 0–50° C. The ratio of the solvent to the pigment may be varied within wide limits and is dependent on the solubility of the pigment. In any event, the ratio must be adjusted to fulfill the condition of complete solution of the pigment in the solvent. Undissolved pigment or foreign material may be removed at this stage by filtration. Many organic pigments will completely dissolve in 8–10 parts by weight of a concentrated sulfuric acid.

Since the pigments generally are not as soluble in organic solvents as they are in inorganic acids, it is necessary to use larger volumes of these solvents, or higher temperatures, or both, in order to effect the necessary complete dissolution. Since the pigment solutions are under pressure for the purpose of sheeting out in the drowning liquid, the temperatures used in preparing the solutions may be above the boiling point of the solvent.

As the aqueous drowning medium, water is generally used due to cheapness and convenience, but other aqueous liquids in which the acids or other solvents used for dissolving the pigments are soluble and in which the pigments are insoluble may be employed, for example, dilute acids and aqueous solutions of inorganic salts. The drowning liquid may contain wetting agents, emulsifying agents or water-immiscible alkali-soluble substances such as liquid fatty acids, naphthenic acids and the like to promote through dispersion the preparation of the pigment in an extremely finely divided form. The temperature of the drowning is restricted only by the freezing and boiling points of the drowning mixture and by the stability of the particular pigment being processed. I have found it convenient to use tap water at about room temperature as the drowning liquid.

The solution of the organic pigment may be drowned in any convenient quantity of the aqueous drowning liquid which is sufficient to precipitate the pigment, the greater dilution being determined only by the size of the equipment used. The lower limit of the volume of the drowning liquid is determined only by that amount necessary to cause rapid precipitation of the pigment and a sufficiently extensive dilution of the pigment solution to avoid growth of the pigment particles. I have found the process to be operative within the range of from 3.3 to over 20 parts by weight of the drowning liquid to each part of pigment solution. Preferably, there is used about 10 parts by weight of drowning liquid to each part of pigment solution.

The drowning process may be carried out in any suitable form of apparatus by which the solution of the organic pigment can be forced as thin sheets into and within the body of the aqueous drowning liquid. An apparatus for carrying out the drowning process is shown in the accompanying drawing in which Fig. 1 is a sectional view of a device for sheeting out of the organic pigment solution, and Fig. 2 is a sectional view along the line 2—2 of the device of Fig. 1.

Referring to Fig. 1, the device for sheeting out of the pigment solution, which suitably is made of steel, comprises cylindrical upper and lower sections 1 and 2, the latter being in the shape of a cap and internally threaded. Integral with the upper section 1 is a depending stem 3 of smaller diameter which is threaded to cooperate with the internally threaded cap 2 which is movable thereon to adjust the distance between the upper and lower sections 1 and 2. A locking screw 4 is threaded through the bottom wall of the cap 2 to impinge against the bottom face of the stem 3 for the purpose of setting the position of the cap 2 on the stem 3.

A tube 5 is threaded into the top of the upper section 1 and communicates with a passage 6 bored therein and extending part way into the stem 3. A series of radially disposed holes 7 located in the stem 3 at a point just below its juncture with the upper section 1 communicate with the passage 6 and lead into an annular trough or sump 8. The number of these holes 7 may vary, being shown as twelve in number, and are proportioned so as to insure delivery of an adequate volume of the pigment solution to the sheeting surfaces 9 and 10 on the upper and lower sections 1 and 2, respectively. The annular sump 8 is composed of opposed hollowed-out sections which may be of triangular cross-section, located in the adjacent surfaces of the upper and lower sections 1 and 2 in aligned relationship.

The sheeting surfaces 9 and 10 are machined parallel and highly ground or polished to provide a substantially tight fit when the upper and lower sections 1 and 2 are brought into contact through movement of the lower section or cap 2 on the stem 3 to the extreme upper position. By adjustment of the cap 2 in an upward or downward direction, the opening between the upper and lower sections of the sheeting device is made smaller or larger and in this way the thickness of the film or sheet of the pigment solution is defined and regulated. A circumferential flange 11 is provided on the upper section 1 to cause the sheeted pigment solution to move in a downward direction.

A suitable vessel is provided to contain the aqueous drowning liquid and the device for sheeting the pigment solution is placed in this vessel and submerged below the surface of the drowning liquid therein to a depth sufficient to insure that the sheeted pigment solution does not break through the surface of the drowning liquid.

The operation of the drowning process of the invention in the apparatus shown in the drawing is illustrated in terms of drowning a sulfuric acid solution of the organic pigment in water as the drowning liquid.

The lower section or cap 2 of the sheeting device is adjusted on the stem 3 so as to define in the slit-like opening S between the sheeting surfaces 9 and 10, the thickness desired in the sheeted pigment solution which is to enter the body of water used as the drowning liquid, and is locked in this position by means of the screw 4. From a source (not shown) of the acid solution of the pigment under the pressure required to cause it to move through the sheeting device and as a thin sheet into the body of the water used as the drowning liquid, the pigment solution moves serially through the tube 5, cooperating passageway 6 and radially disposed holes 7 into the annular sump 8 from whence, under the applied pressure, it is forced through the slit-like opening S as a thin sheet into and beneath the surface of the water. For purposes of illustration the opening S is shown of greater thickness than generally is to be employed. The sheeted pigment solution is prevented from breaking through the surface of the water by the fact that the sheeting device is submerged an adequate distance beneath the surface of the water and the sheet of pigment solution is forced in a downward direction by the overhanging circumferential flange 11 on the upper section 1.

As explained above, a rapid overall mixing of the pigment solution with the water takes place due to the presence of innumerable small eddy currents in the water at the interfaces between it and the moving sheet of pigment solution. Due to this rapid overall mixing of the two liquids, the pigment is quickly precipitated in an extremely fine particle form. The drowning liquid and precipitated pigment may be collected in any suitable way for filtration and the presscake, following the usual practice, washed to remove acid.

The process of the invention is further illustrated by the following specific examples to which, however, it is not intended that the invention be limited. Parts are by weight.

*Example 1*

10 parts of copper phthalocyanine is dissolved in 160 parts of 96% sulfuric acid. The solution, under a pressure of 2000 lbs. per square inch, is ejected as a thin sheet of .0015 inch thickness from the slit-like orifice S of the apparatus shown in the drawing into a stationary body of 100 parts of water at about room temperature, the orifice S being submerged in the body of water. The precipitated pigment is recovered by filtration and the presscake washed acid-free to litmus with water. The pigment has a darker masstone and a 20% greater tinctorial strength than the pigment precipitated from the acid solution by the conventional drip method of drowning.

*Example 2*

10 parts of the vat dyestuff 3,3'-dichloro-N-dihydro-anthraquinoneazine powder is dissolved in 160 parts of 96% sulfuric acid. Repeating the procedure of Example 1, the acid solution of the color is drowned, the precipitated color collected and the presscake washed with water acid-free to litmus. The presscake is increased to a 20% solids content by kneading for about 5 minutes in a Werner-Pfleiderer mixer, filtering and once repeating the kneading and filtering operations. Padded onto cloth from an emulsion of the presscake, the precipitated color gives dyeings of definitely greater tinctorial strength than the color precipitated from the acid solution by the conventional drip method of drowning.

I claim:

1. In the process of preparing water-insoluble organic pigments in an extremely finely divided form by drowning a solution of the organic pigment in an aqueous liquid in which the pigment is insoluble, the improvement which comprises carrying out the drowning by forcing the solution of the organic pigment as a thin sheet into and wholly within a stationary to laminarly flowing body of the aqueous liquid, the sheet of pigment solution moving at a speed such that there is set up between the two bodies of liquid at the interface therebetween, a system of relative motion in which, relative to the sheet of pigment solution, the aqueous liquid is moving at a speed greater than its critical velocity and in a state of turbulent flow.

2. The process as defined in claim 1, wherein the thin sheet of pigment solution is the sole means for imparting motion to the body of aqueous liquid.

3. In the process of preparing water-insoluble organic pigments in an extremely finely divided form by drowning an acid solution of the organic pigment in water, the improvement which comprises carrying out the drowning by forcing the acid solution of the organic pigment as a thin sheet into and wholly within a stationary to laminarly flowing body of the water, the sheet of pigment solution moving at a speed such that there is set up between the two bodies of liquid at the interface therebetween, a system of relative motion in which, relative to the sheet of pigment solution, the water is moving at a speed greater than its critical velocity and in a state of turbulent flow.

4. The process as defined in claim 3, wherein the organic pigment is a vat dyestuff.

5. In the process of preparing phthalocyanine pigments in an extremely finely divided form by drowning an acid solution of the pigment in water, the improvement which comprises carrying out the drowning by forcing the acid solution of the pigment as a thin sheet into and wholly within a stationary to laminarly flowing body of the water, the sheet of pigment solution moving at a speed such that there is set up between the two bodies of liquid at the interface therebetween, a system of relative motion in which, relative to the sheet of pigment solution, the water is moving at a speed greater than its critical velocity and in a state of turbulent flow.

6. The process as defined in claim 5, wherein the pigment is copper phthalocyanine.

DONALD E. MARNON.

REFERENCES CITED

The following references are of record in the file of this patent:

UNITED STATES PATENTS

| Number | Name | Date |
|---|---|---|
| 2,307,509 | Joachim et al. | Jan. 5, 1943 |
| 2,334,812 | Detrick et al. | Nov. 23, 1943 |